United States Patent [19]
Tuckey

[11] Patent Number: 5,458,104
[45] Date of Patent: Oct. 17, 1995

[54] DEMAND FUEL PRESSURE REGULATOR

[75] Inventor: Charles H. Tuckey, Cass City, Mich.

[73] Assignee: Walbro Corporation, Cass City, Mich.

[21] Appl. No.: 181,848

[22] Filed: Jan. 14, 1994

[51] Int. Cl.[6] .................................................. F02M 37/04
[52] U.S. Cl. ............................ 123/463; 123/467; 137/510
[58] Field of Search ............................. 123/467, 463,
123/497, 506, 456, 514; 137/510, 563, 569

[56] References Cited

U.S. PATENT DOCUMENTS

| 3,913,547 | 10/1975 | Wentworth | 123/497 |
|---|---|---|---|
| 4,228,777 | 10/1980 | Haase | 123/463 |
| 4,284,039 | 8/1981 | Bellicardi | 123/463 |
| 4,437,443 | 3/1984 | Hofbauer | 123/467 |
| 4,497,300 | 2/1985 | Muruyama | 123/463 |
| 4,539,960 | 9/1985 | Cowles | 123/463 |
| 4,782,808 | 11/1988 | Bostick | 123/467 |
| 4,790,343 | 12/1988 | Mochizuki | 123/463 |
| 4,825,835 | 5/1989 | Deweerdt | 123/467 |
| 4,936,342 | 6/1990 | Kojima | 123/463 |
| 4,951,637 | 8/1990 | Cook | 123/463 |
| 4,991,556 | 2/1991 | Mahnke | 123/465 |
| 4,996,963 | 3/1991 | Fehrenbach | 123/463 |
| 5,018,500 | 5/1991 | Triold | 123/456 |
| 5,022,372 | 6/1991 | Iwura | 123/456 |
| 5,076,320 | 12/1901 | Robinson | 123/463 |
| 5,113,831 | 5/1992 | Grant | 123/467 |
| 5,133,323 | 7/1992 | Treusch | 123/497 |
| 5,148,792 | 9/1992 | Tuckey | 123/497 |
| 5,265,644 | 11/1993 | Tuckey | 137/510 |
| 5,279,327 | 1/1994 | Alsobrooks | 123/463 |
| 5,295,469 | 3/1994 | Kariya | 123/456 |

Primary Examiner—Carl S. Miller
Attorney, Agent, or Firm—Barnes, Kisselle, Raisch, Choate, Whittemore & Hulbert

[57] ABSTRACT

A fuel pressure regulator for a no-return fuel system for an automotive engine with fuel injectors having a housing with a flexible diaphragm between first and second chambers. The second chamber has a fuel inlet with a valve therein to admit fuel to the second chamber and an outlet to supply fuel to the engine. The second chamber is in continuous communication with the engine to accumulate any fuel expansion that may occur during engine deceleration or when the engine is turned off due to heating the fuel. The first chamber continuously communicates with the engine air intake manifold so that fuel is supplied to the engine fuel injectors at a substantially constant pressure drop across the injectors.

21 Claims, 2 Drawing Sheets

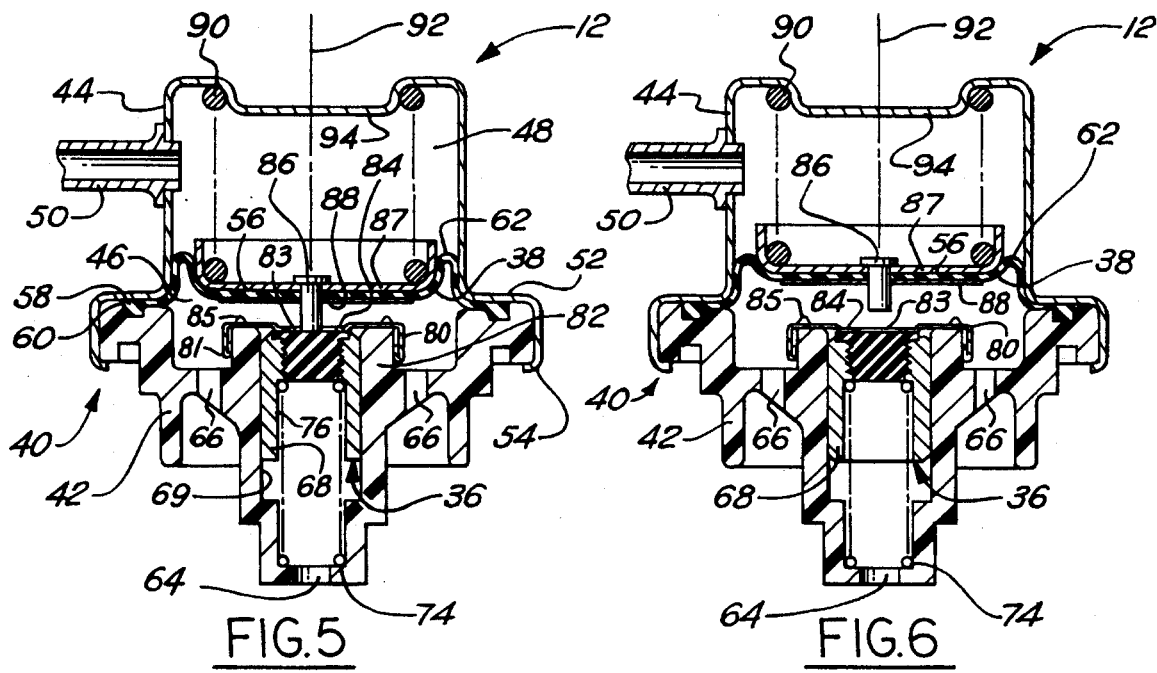
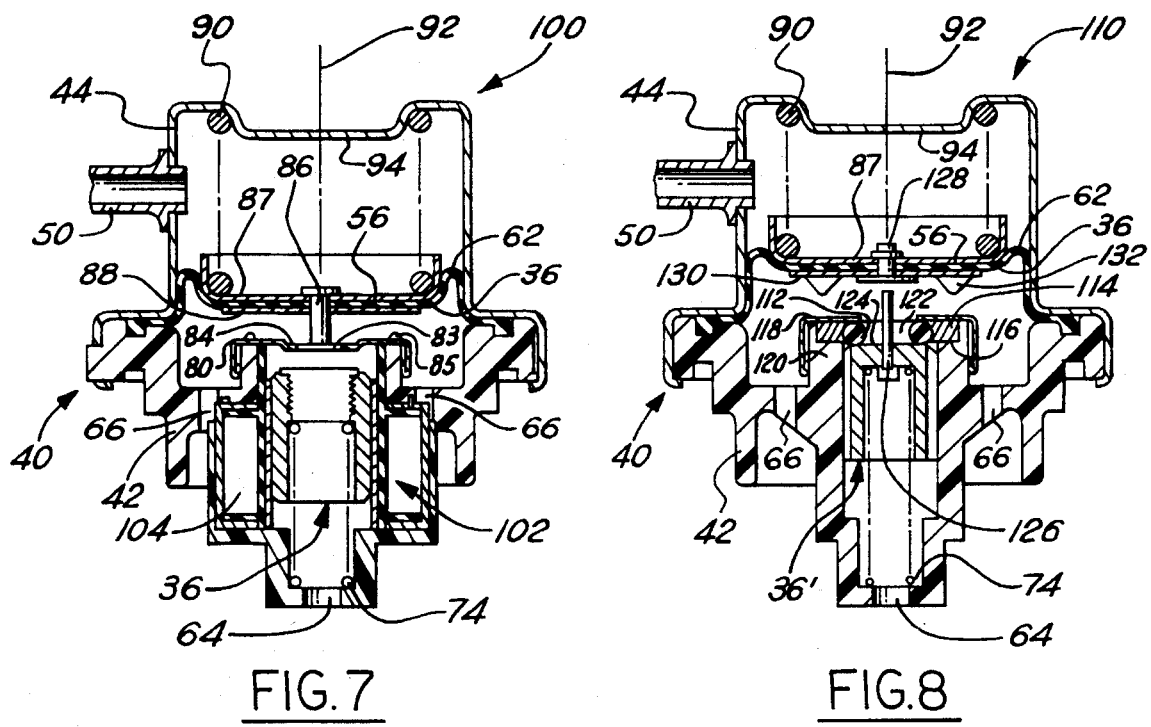

DEMAND FUEL PRESSURE REGULATOR

FIELD OF THE INVENTION

This invention relates to pressure regulators and more particularly to a pressure demand regulator for fuel for an internal combustion engine.

BACKGROUND OF THE INVENTION

In many engines with fuel injection systems, it is desirable to supply liquid fuel to the injector or injectors at a pressure which varies as a function of the manifold pressure so that the pressure drop across the injectors remains constant. Both the manifold pressure and the flow rate of fuel supplied by the injectors to the engine varies with engine speed, load and other operating conditions.

Previous fuel supply systems have been developed one of which is shown and described in U.S. Pat. No. 5,148,792. This system has a fuel tank with a fuel pump to supply fuel under pressure through a fuel line to a fuel rail coupled to a fuel injector for supplying fuel to the engine cylinder. The pump includes a pressure sensor which provides an electrical signal as a function of fuel pressure at the pump outlet to an electronic control to vary the speed of the pump to maintain a constant pressure within the fuel line. However, this system cannot maintain a constant pressure differential across the injectors.

Previous systems have been known to include a pressure regulator which has a manifold reference to maintain a constant pressure drop across the injectors. One such regulator is disclosed in U.S. Pat. No. 5,265,644. However, these prior regulators cannot accommodate any increase in pressure caused by fuel expansion due to heat rise and do not accumulate the increased volume of the heated fuel. For example, during engine deceleration the injectors may close trapping fuel in the fuel rail. The high temperature within the fuel rail causes the fuel to be heated and expand which increases the pressure in the fuel rail.

Pressure rise and fuel expansion in the rail also occurs during conditions known as hot soak. Hot soak conditions occur when the engine has been idling or running at slow speeds especially during hot weather or when the hot engine is turned off. The high temperature in the fuel rail plus the hot ambient air causes the fuel trapped in the fuel rail to be heated and expand. Some pressure increase is desirable to prevent fuel vapor formation. However, excessive pressure in the fuel rail is undesirable since it could force fuel through the injectors causing leakage and/or malfunctions.

In these by-pass type regulators, any fuel pressure above the set system pressure is relieved by returning fuel to the tank through a fuel return line. Thus, such devices only maintain a set system pressure. Since these regulators cannot accomodate any pressure higher than system pressure fuel vapor is allowed to form when the fuel is heated excessively.

SUMMARY OF THE INVENTION

A demand regulator is provided for use in a no-return fuel system to limit and regulate a desired pressure in the fuel rail during normal driving conditions, to respond to the manifold vacuum to maintain a constant pressure differential across the injectors during normal and transient driving speeds, to act as an accumulator to accomodate fuel expansion due to heating of fuel in the rail and accomodate and maintain increased pressure of heated fuel in the rail to prevent vapor formation therein.

To limit and regulate pressure in the fuel rail, the demand regulator of the present invention is preferably coupled to the fuel rail at a location close to the manifold. Thus, a manifold reference is easily provided to the demand regulator in order to regulate the pressure in the fuel rail to maintain a constant pressure drop across the fuel injectors.

The demand regulator has a diaphragm received between a first gas chamber communicating with an engine intake manifold and a second liquid fuel chamber continuously communicating with a fuel rail of the engine. Liquid fuel is supplied at a constant pressure by a pump to the second chamber through a valve that opens and closes in response to movement of the diaphragm. In normal operation this supplies fuel to the rail at a pressure (such as 50 PSIG) somewhat lower than the constant pressure (such as 55 PSIG) of fuel supplied by the pump. If the fuel in the rail is heated and expands, the valve closes and the diaphragm is displaced to increase the volume of the second chamber and thereby accomodate expansion of the heated fuel. Preferably, if the fuel in the rail is heated sufficiently to increase its pressure above a maximum desired higher pressure (such as 60 PSIG) then the valve opens to back bleed fuel to provide pressure relief at the desired maximum pressure.

In another embodiment, the valve is also opened by a solenoid during certain hot soak conditions when it would otherwise be closed. The solenoid holds the valve open so that fuel is supplied by the pump (at 55 PSIG) to the rail to prevent formation of fuel vapor therein.

Objects, features and advantages of this invention are to provide a fuel pressure demand regulator for a no-return fuel system which maintains a constant fuel pressure drop across the injectors in response to varying normal engine operating conditions, accumulates heated expanded fuel in the fuel rail, decreases engine emissions, relieves excessive pressure of the heated expanded fuel, and is rugged, durable, maintenance free, of relatively simple design and economical manufacture and assembly, and has a long in service useful life.

BRIEF DESCRIPTION OF THE DRAWINGS

These and other objects, features, and advantages of this invention will be apparent in view of the following detailed description of the best mode, appended claims and accompanying drawings in which:

FIG. 5 is a sectional view similar to FIG. 2 showing the valve in a normal operational position;

FIG. 6 is a sectional view similar to FIG. 2 showing the regulator during heated fuel expansion;

FIG. 7 is a sectional view of a second embodiment of the pressure regulator; and FIG. 8 is a sectional view of a third embodiment of the pressure regulator.

DETAILED DESCRIPTION

Figure 1:
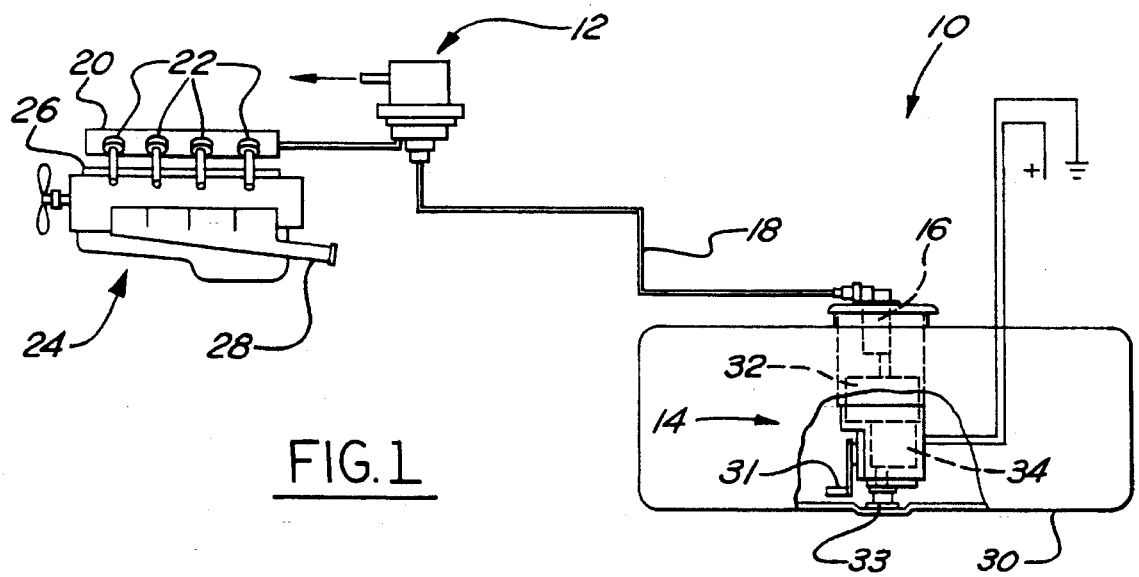
FIG. 1 is a schematic view of a fuel pressure regulator embodying this invention in a no-return fuel supply and control system for a fuel injected internal combustion engine.

Referring in more detail to the drawings, FIG. 1 illustrates a no-return fuel delivery system 10 incorporating a demand fuel regulator 12 of the present invention for an internal combustion engine. The fuel delivery system has a fuel pump module 14 with a fuel manifold 16 connected through the regulator by fuel lines 18 and 19 to a fuel rail 20 and fuel injectors 22 of an internal combustion engine 24 with an air intake manifold 26 and an exhaust manifold 28 for an automotive vehicle, such as an automobile. In assembly, the pump module 14 is mounted in a fuel tank 30 and has a fuel level sensor 31 and a fuel pump 32 with an inlet communicating with the bottom of the tank through a fuel filter 33 and an outlet communicating with the manifold inlet. The pump is driven by an electric motor 34, the speed of which may be varied to control the pressure of fuel delivered by the pump to the engine through the manifold 16 which produces a regulated constant output pressure in line 18, which is typically about 55 PSI. Fuel at a reduced pressure is supplied to the demand regulator 12 to the rail through line 19. The fuel system does not have any fuel return line from the rail or regulator 12 to the fuel tank and is often referred to as a no-return fuel system.

Figure 2:
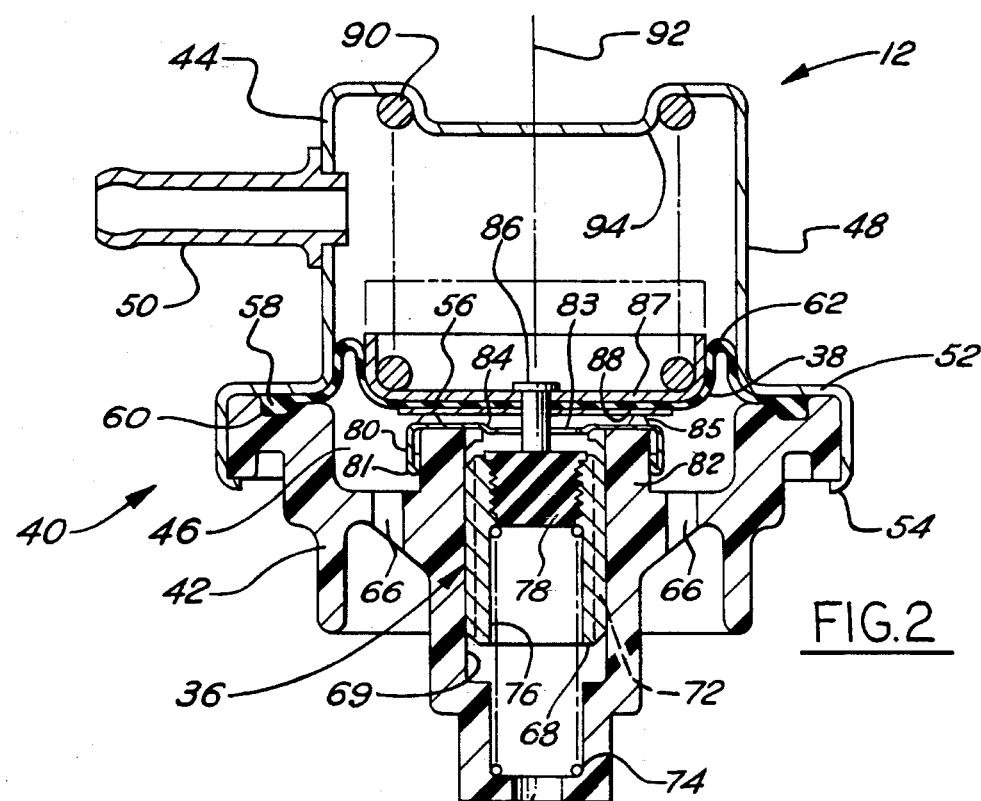
FIG. 2 is a sectional view of the fuel pressure regulator embodying this invention with the valve shown at an open position.
Figure 3:
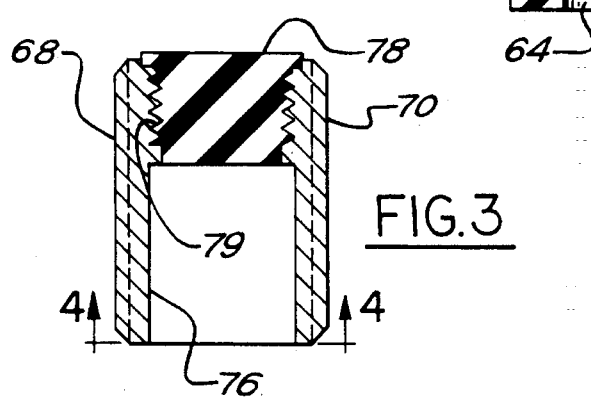
FIG. 3 is an enlarged sectional view of the valve.
Figure 4:
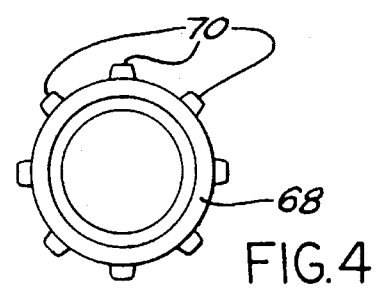
FIG. 4 is a bottom view of the valve.

Referring now to FIG. 2, the fuel regulator 12 embodying this invention is illustrated having a valve assembly 36 shown in a full open position and actuated by a diaphragm 38. Both the valve assembly and the diaphragm are received in a housing 40 defined by a body 42 and a cap 44. The diaphragm and housing define a liquid fuel chamber 46 on one side of the diaphragm and a gas chamber 48 on the other side of the diaphragm. The cap has a passage or tube 50 communicating with the gas chamber 48 at one end and connected to the engine manifold at the other end. The cap is secured by a flange 52 with a return bend 54 rolled around the body 42 during assembly of the components.

The diaphragm 38 has a relatively thin and flexible central portion 56 and a circumferentially continuous peripheral rib 58 received in a groove 60 in the body and retained therein by the cap to provide fluid tight seals between them and the diaphragm. Preferably, to provide a more flexible and responsive diaphragm, it has a circumferentially continuous pleat or bellows 62. Preferably, the active portion of the diaphragm has a diameter of about 0.720 inches and is made of a flexible elastomer such as a fluorosilicone rubber or preferably an acronytrile butadiene rubber and may be reinforced with a fabric embedded in the elastomer.

Liquid fuel is admitted to the chamber 46 through an inlet passage 64 in the body and around the valve assembly 36. Fuel is discharged from the chamber 46 through spaced outlet ports 66 to the fuel rail. The valve assembly has a valve body 68 slidably received in a counterbore 69 in the inlet passage. The valve body has a plurality of axially extending and radially projecting ribs 70 forming flow passages 72 with the body 42. The valve is biased by a spring 74 received in a bore 76 in the valve body and acting against the body 42. The end of the valve body is closed by a rubber tip 78 that is preferably injection molded to the valve body. The threads 79 provide a mechanical securement between the rubber tip and the metal valve body. A cap 80 with a rim 81 is received on and sealed to an annular portion 82 of the body and has a central through hole 83 surrounded by an annular valve seat 84. When the valve assembly is closed (FIG. 5), the rubber tip 78 engages the valve seat 84. The cap is press fit or otherwise secured to the body 42 and has a plurality of circumferentially spaced apart dimples 85 which when bearing on the diaphragm permit fuel to flow into chamber 46. Preferably the central hole 83 has a diameter of about 0.18 inches.

The valve is engaged by a valve pin 86 that projects through a central hole in the diaphragm to bear against the rubber tip 78. The valve pin is secured and sealed to the diaphragm by a retainer ring 87 with an upturned edge and a retainer disk 88 on the opposite side of the diaphragm. The diaphragm and the valve pin are yieldably biased toward the valve seat 84 by a compression spring 90 disposed in the chamber 48 and bearing on the retainer ring and cap. The spring is retained generally in coaxial alignment with the longitudinal axis 92 by an annular shoulder 94 in the cap on which it seats and the upturned edge of the retainer ring 87.

In use, the demand regulator 12 maintains, varies and limits the pressure in the fuel rail to provide a constant pressure drop across the injectors. This is accomplished by applying the manifold pressure to chamber 48 through tube 50 to cause the diaphragm to actuate the valve 36 to vary and limit the pressure of the fuel supplied to the rail. Since chamber 46 is in constant communication with the fuel rail through ports 66, any pressure change in chamber 46 is transmitted thereto.

If the engine is operating under a steady state condition with a constant intake manifold pressure and a constant fuel flow rate to the rail, the opposing forces acting on the valve 36 would be balanced with the valve in an open position as shown in FIG. 2. The net difference of the force produced by spring 90 and opposed by the fuel in the chamber 46 acting on the diaphragm is transmitted to the valve 36 through the pin 86. The opposing forces acting on the valve are the force produced by the bias of spring 74 plus the force produced by the difference between the pressure of the fuel in chamber 46 and the fuel supplied by the pump through inlet 64 acting on the effective areas of the opposed faces of the valve 36. Because normal engine operation usually produces dynamic and varying conditions, not steady state static conditions, the valve usually rapidly opens and closes or hunts to maintain a substantially constant differential pressure across the fuel injectors by varying the absolute pressure of the fuel supplied by the regulator to the fuel rail.

Under certain conditions, such as engine deceleration or hot soak, the valve 36 closes and the fuel trapped in the rail 20 may be heated sufficiently to expand its volume. As the fuel expands, the diaphragm 38 and thus the pin 86 move away from the valve 36 and the pressure of the fuel trapped in the rail and the chamber 46 increases. This both accumulates the expanded fuel and the increased pressure retards and usually prevents the heated fuel from vaporizing. Movement of the diaphragm and hence expansion of the volume of the chamber 46 also decreases the extent to which the pressure increases and helps to prevent excessive pressure buildup. Such excessive pressure would cause the fuel in the rail to be forced through the injectors causing them to malfunction. If, due to heating, the pressure of the expanded fuel becomes excessive, it will cause the valve 36 to be forced open against the bias of the spring 74 to provide pressure relief by back bleeding fuel past the valve and through the passage 64 to thereby limit the maximum pressure buildup of the expanded fuel trapped in the rail and chamber 46. Once the pressure of the trapped fuel in the rail and chamber returns to the maximum value, the valve 36 again closes.

The maximum pressure at which this relief and back bleeding occurs is a function of both forces produced by the spring 74 and the differential in the pressure of the fuel in the chamber 46 and the fuel supplied to the passage 64 acting on the effective areas of the opposed faces of the valve 36. Hence, the maximum pressure at which this relief occurs can be predetermined and designed into the regulator by changing these variables. Usually, this is most easily accomplished by changing the force produced on the valve by the spring 74.

As a typical example, the valve can be designed so that in normal operation the constant pressure differential across the injectors is 50 PSIG, constant pressure of the fuel supplied to the inlet passage 64 by the pump module 14 is 55 PSIG and the maximum overpressure in chamber 46 due to heating of trapped fuel at which pressure relief occurs is about 60 PSIG. Typically, this regulator is used with an engine having a manifold vacuum pressure which varies in the range of about 5 to 25 PSIA. When, due to changing operating conditions the pressure of the trapped fuel in the rail and chamber 46 drops to 50 PSI the valve 36 opens against the force of the spring 74 to supply fuel from the inlet 64 to the rail. One practical embodiment of this regulator which functions with these pressures and operating parameters has a diaphragm 38 with an effective diameter of about 0.72 of an inch, a spring 90 with a force of about 20 pounds and a spring rate of about 37 pounds per inch, a central hole through the seat 84 with a diameter of about 0.18 of an inch and a valve 36 with opposed faces each having an effective area of about 0.025 of a square inch.

Another embodiment of the regulator 100 is shown in FIG. 7 which has essentially the same elements and construction as regulator 12 plus an electric solenoid 102 to override and open the valve 36 under extreme hot soak conditions when it would otherwise be closed. The body of the valve 36 is made of a ferro magnetic material, such as steel, so that it will be actuated or moved to its open position when a coil 104 of the solenoid is electrically energized.

During extreme hot soak conditions, the temperature of the trapped fuel in the rail and chamber 46 may rise to 170° F. to 220° F. At this extreme temperature, it is necessary to maintain the pressure of fuel in the rail at a minimum of 55 to 60 PSIG to prevent vapor formation. When starting an engine under these extreme hot soak conditions, the differential fuel pressure across the injectors would drop to 50 PSIG before the valve 36 would normally open and this pressure drop would result in some flash vaporization and formation of fuel vapor in the rail which would adversely affect engine operation. To avoid this condition, when the temperature rises above 170° F. a temperature sensor produces a signal to activate the solenoid and open the normally closed valve 36 when the ignition is turned on so that before the engine is cranked and started, the pressure of fuel supplied to the inlet 64 maintains a high enough pressure of the fuel in the rail to prevent vapor formation. The temperature sensor and solenoid overrides the normal regulator operation and maintains the solenoid in its open condition until the fuel temperature drops below 170° F. whereupon the solenoid is deactivated so that the regulator returns to its normal operating condition as previously described in connection with the regulator 12.

FIG. 8 illustrates a modified fuel regulator 110 in which all of the component parts identical to those of the fuel regulator 12 have the same reference numerals. Regulator 110 has a modified valve seat provided by an O-ring 112 received in a carrier disk 114 which is retained in a counterbore 116 by a cap 118 retained on the annular portion 120 of the body and having a central through hole 122. The valve 36' has a modified body with a closed end face 124 which seals against the O-ring when the valve is closed. A actuator pin 126 projects through and is fixed and sealed to the end face of the valve body for engagement by the diaphragm to move the valve. For engaging the pin, a button 128 is secured and sealed to the spring retainer 87, diaphragm and a backup disk 130. The disk 130 has circumferentially spaced and downwardly projecting dimples 132 which when they bear on the retainer cap 118 maintain a gap between them for the flow of fuel into the chamber 46. In use, the regulator 110 operates in essentially the same way as the regulator 12 of FIG. 2 except that the pin 126 is carried by the valve and is independent of the diaphragm 38.

What is claimed is:

1. A fuel pressure regulator for a no-return fuel delivery system for an internal combustion engine with an air intake manifold and at least one fuel injector, the regulator comprising: a housing, a flexible diaphragm defining in cooperation with the housing first and second chambers, said diaphragm having generally opposed faces with one of the faces communicating with only the first chamber and the other face communicating with only the second chamber, one of the chambers having a passage for continuously communicating with an air intake manifold of an engine, the other chamber having an inlet for supplying fuel to said other chamber and an outlet for continuously communicating with at least one fuel injector of the engine for supplying fuel thereto, a valve associated with said inlet and movable to open and closed positions to control the flow of fuel through said inlet and into said other chamber, an actuator pin carried by one of said diaphragm and said valve for movement therewith for opening and closing said valve, a first spring yieldably biasing said diaphragm toward said valve, so that under normal operating conditions said diaphragm actuates said valve to maintain a substantially constant pressure drop across the injectors, and when said valve closes and the volume of fuel trapped between the injector and said valve expands, the diaphragm moves away and disengages from said valve to accommodate the expansion of the fuel.

2. The pressure regulator of claim 1 which also comprises a second spring yieldably biasing said valve toward its closed position.

3. The pressure regulator of claim 1 which also comprises a second spring yieldably biasing said valve toward its closed position and said valve has generally opposed effective areas constructed and arranged so that when said valve is closed, one of the effective areas communicates only with fuel in said other chamber and the other effective area communicates with fuel supplied to the inlet upstream of said valve such that when said valve is closed and the pressure of expanded fuel in said other chamber exceeds by a predetermined value the pressure of the fuel in said inlet upstream of said valve, said valve will open against the bias of said second spring to limit the maximum pressure of the fuel in said other chamber by back bleeding a portion thereof into said inlet upstream of said valve.

4. The pressure regulator of claim 1 wherein said valve has generally opposed effective areas constructed and arranged so that when said valve is closed, one of the effective areas communicates only with fuel in said other chamber and the other effective area communicates with fuel supplied to the inlet upstream of said valve such that when said valve is closed and the pressure of expanded fuel in said other chamber exceeds by a predetermined value, the pressure of the fuel in said inlet upstream of said valve said valve will open against the bias of said second spring to limit the maximum pressure of the fuel in said other chamber by back bleeding a portion thereof into said inlet upstream of said valve.

5. The pressure regulator of claim 3 wherein said actuator pin is carried by said diaphragm for movement in unison therewith.

6. The pressure regulator of claim 4 wherein said actuator pin is carried by said diaphragm for movement in unison therewith.

7. A fuel pressure regulator for use in a no-return fuel delivery system for an internal combustion engine including a fuel supply with a pump responsive to application of electrical power for delivering fuel under pressure, an engine air intake manifold, a fuel rail for delivery of fuel to a plurality of fuel injectors, and a pressure control to regulate fuel pressure from the fuel supply, said pressure regulator comprising: a housing, a diaphragm defining in cooperation with the housing a first chamber and a second chamber, a manifold reference line communicating the first chamber with the air intake manifold, a fuel inlet in the second chamber, a fuel outlet in the second chamber to supply fuel to the fuel rail, a valve seat associated with said fuel inlet and having a surface for engagement with a complementary valve element, a first spring in said first chamber for urging said diaphragm generally axially toward said valve seat, a valve element having an exterior surface portion for sealing engagement with said valve seat, a valve actuator carried by one of said diaphragm and said valve element, and a valve spring yieldably urging said valve element toward said seat, so that under normal operating conditions said valve actuator remains in engagement with the other of said diaphragm and said valve element to open and close the valve as required to maintain a substantially constant pressure differential across the injectors, and said second chamber being in constant communication with the fuel rail through said fuel outlet to accumulate fuel expansion due to any rise in temperature in the fuel rail.

8. The pressure regulator set forth in claim 1 wherein said valve element has an elongate body located within said inlet and having a plurality of axially extending ribs spaced circumferentially about an outer portion thereof, said ribs lying closely adjacent the wall of the bore to form flow passages for fuel, and said valve element being slidable in said bore.

9. The pressure regulator set forth in claim 2 wherein the exterior surface portion of said valve element comprises a threaded tip member injection molded into a threaded end of said valve element.

10. The pressure regulator set forth in claim 3 wherein said tip member is made of rubber.

11. The pressure regulator set forth in claim 1 wherein said valve seat comprises spacers extending away from said valve seat for engagement with said diaphragm to create a gap between said diaphragm and said valve seat to allow fuel flow therebetween.

12. The pressure regulator set forth in claim 2 wherein said actuator pin is carried by said diaphragm.

13. The pressure regulator set forth in claim 2 wherein said actuator pin is carried by said valve element.

14. The pressure regulator set forth in claim 1 which also comprises, a temperature sensor at the fuel rail to sense the temperature of the fuel therein, a solenoid within said housing about said valve element, and means responsive to said sensor to activate said solenoid to open said valve at a predetermined temperature.

15. The pressure regulator set forth in claim 8 wherein the predetermined temperature is in the range of about 170° F. to 220° F.

16. The pressure regulator set forth in claim 1 which also comprises an electric coil carried by said housing and encircling at least a portion of said valve, and at least a portion of said valve comprises a ferromagnetic material disposed in said coil and responsive to energization of said coil to move said valve to its open position.

17. The pressure regulator as set forth in claim 1 which also comprises, an electric solenoid operably connected with said valve to open said valve when said solenoid is energized, a temperature sensor for sensing the temperature of fuel downstream of said valve, said temperature sensor being operably associated with said solenoid to open said valve when the temperature of the fuel downstream of said valve is greater than a predetermined temperature and to deenergize said solenoid when the temperature of the fuel drops below said predetermined temperature.

18. The pressure regulator as set forth in claim 7 which also comprises, an electric solenoid operably connected with said valve to open said valve when said solenoid is energized.

19. The pressure regulator as set forth in claim 18 wherein said solenoid comprises an electric coil carried by said housing and encircling at least a portion of said valve, and at least a portion of said valve comprises a ferromagnetic material disposed in said coil and responsive to energization of said coil to move said valve to its open position.

20. The pressure regulator as set forth in claim 18 which also comprises, a temperature sensor for sensing the temperature of fuel downstream of said valve, said temperature sensor being operably associated with said solenoid to open said valve when the temperature of the fuel downstream of said valve is greater than a predetermined temperature and to deenergize said solenoid when the temperature of the fuel drops below said predetermined temperature.

21. The pressure regulator set forth in claim 1 further comprising means coupled to said valve element and responsive to temperature of the fuel for opening said valve when fuel temperature reaches a preselected temperature.

* * * * *

UNITED STATES PATENT AND TRADEMARK OFFICE
CERTIFICATE OF CORRECTION

PATENT NO. : 5,458,104
DATED : October 17, 1995
INVENTOR(S) : Charles H. Tuckey

It is certified that error appears in the above-indentified patent and that said Letters Patent is hereby corrected as shown below:

Col. 7, in line 34, after "temperature" insert -- of fuel --.

Signed and Sealed this

Third Day of June, 1997

Attest:

BRUCE LEHMAN

Attesting Officer    Commissioner of Patents and Trademarks